United States Patent [19]

Onishi et al.

[11] Patent Number: 5,244,846
[45] Date of Patent: Sep. 14, 1993

[54] OPTICAL FUNCTIONING GLASS AND APPARATUS USING THE SAME

[75] Inventors: Masashi Onishi; Koji Nakazato; Hiroo Kanamori; Minoru Watanabe, all of Yokohama; Yoshiaki Miyajima, Mito, all of Japan

[73] Assignees: Sumitomo Electric Industries, Ltd., Osaka; Nippon Telegraph and Telephone Corp., Tokyo, both of Japan

[21] Appl. No.: 829,477

[22] Filed: Feb. 3, 1992

[30] Foreign Application Priority Data

Feb. 1, 1991 [JP] Japan ................... 3-012178

[51] Int. Cl.$^5$ .......................... C03C 3/32; H01S 3/07
[52] U.S. Cl. .......................... 501/40; 65/3.11; 65/134; 372/6; 385/142
[58] Field of Search .......................... 385/142; 372/6; 65/3.11, 134, 136; 374/131; 501/64, 40

[56] References Cited

U.S. PATENT DOCUMENTS

| | | | |
|---|---|---|---|
| 3,580,859 | 5/1971 | Buzhinsky et al. | 252/301.1 |
| 3,729,690 | 4/1973 | Snitzer | 372/6 X |
| 3,731,225 | 5/1973 | Wild et al. | 372/6 |
| 3,755,757 | 8/1973 | Woodcock | 331/94.5 |
| 3,789,389 | 12/1988 | Schermerhorn et al. | 65/3.11 X |
| 4,015,217 | 3/1977 | Snitzer | 372/6 |
| 4,044,315 | 8/1977 | Snitzer | 372/6 X |
| 4,081,761 | 3/1978 | Melamed et al. | 331/94.5 |
| 4,445,755 | 1/1984 | Ohsawa et al. | 501/37 X |
| 4,699,889 | 10/1987 | Sales et al. | 65/3.11 X |
| 4,885,019 | 12/1989 | Hutta | 65/3.11 |

FOREIGN PATENT DOCUMENTS

| | | |
|---|---|---|
| 0462613 | 12/1991 | European Pat. Off. |
| 63-112440 | 5/1988 | Japan |
| 1409726 | 10/1975 | United Kingdom |
| 2082168 | 3/1982 | United Kingdom |

OTHER PUBLICATIONS

Sytk'ko et al., "Luminescent Converter for Solar-Cell Collectors Based on UO22+ and ND3+ Coactivated Phosphate Glass", Applied Solar Energy, vol. 25, No. 5, 1989, New York, pp. 22-25.

D. Becherescu et al., "Fluorescent Glasses", Chemical Abstracts, vol. 113, No. 24, Dec. 1990, Columbus, Ohio, abstract No. 216566P.

*Primary Examiner*—Robert L. Lindsay
*Attorney, Agent, or Firm*—Cushman, Darby & Cushman

[57] ABSTRACT

An optical functioning glass for enabling optical amplification at 1.3-$\mu$m wavelength band or increasing efficiency of the amplification is disclosed. The optical functioning glass contains $Nd^{3+}$ as an active material and uranium, both of which are doped in a multi-component function glass serving as a host glass. Since uranium is doped in the optical functioning glass, light emission of $Nd^{3+}$ in the 1.06-$\mu$m wavelength band can be absorbed by uranium. A decrease in efficiency of induced emission in a 1.3-$\mu$m wavelength band can be prevented, and an optical functioning glass suitable for optical amplification in the 1.3-$\mu$m wavelength band can be obtained. When a fiber is formed using the optical functioning glass as a core, a low-threshold, high-gain fiber amplifier, fiber laser, and the like can be obtained.

6 Claims, 8 Drawing Sheets

OPTICAL FUNCTIONING GLASS AND APPARATUS USING THE SAME

BACKGROUND OF THE INVENTION

1. Field of the Invention

The present invention relates to an optical functioning glass, an optical fiber, an optical waveguide device, and an optically active apparatus used for optical amplification and the like at the 1.3-μm wavelength band.

2. Related Background Art

Efforts have been made to manufacture optical devices such as a fiber amplifier, a fiber sensor, and a fiber laser by using a glass doped with a rare-earth element for the application in the fields of optical communications at the 1.3-μm wavelength band and the like. For example, a report has been made (ELECTRONICS LETTERS, 1990, Vol. 26, No. 2, pp. 121-122) in which a neodymium ion ($Nd^{3+}$) was added to phosphate-based multi-component glass, an optical fiber was formed from this glass, and laser oscillation characteristics of this optical fiber were evaluated. This report shows the characteristics of the optical fiber that a fluorescence peak wavelength was 1.32-μm, an ESA (excited state absorption) peak wavelength was 1.31-μm, and an oscillation peak wavelength was 1.36-μm.

In the multi-component glass indicated in the above report, a sufficiently high laser gain cannot be obtained at the 1.3-μm wavelength band, because the intensity of the fluorescence peak of $Nd^{3+}$ at the 1.32-μm wavelength is relatively weak, and because a relatively high absorption peak caused by ESA transition is present at the wavelength of 1.31-μm.

Further, when optical amplification is performed by utilizing induced or stimulated emission as in the above optical fiber, problems are not only that the fluorescence peak at 1.31-μm wavelength is weak but also that other fluorescence peaks due to possible transition are present. More specifically, in the above optical fiber, in addition to the fact that the fluorescence peak of $Nd^{3+}$ at the 1.3-μm wavelength band is relatively weak, the fact that emissions of $Nd^{3+}$ at the 0.8- and 1.06-μm wavelength bands corresponding to other possible transition is relatively strong poses a problem. Due to the induced emission by the light emissions at the 0.8-μm and the 1.06-μm wavelength band, the stimulated emission at the 1.3-μm wavelength band is impeded, and an induced emission efficiency is significantly reduced.

SUMMARY OF THE INVENTION

It is an object of the present invention, to provide an optical functioning glass capable of performing optical amplification at the 1.3-μm wavelength band or near 1.3-μm wavelength band, or improving optical amplification efficiency.

It is another object of the present invention to provide an optical fiber and an optical waveguide device, both of which use the above optical functioning glass.

It is still another object of the present invention to provide an optically active apparatus such as an amplifier or a laser, which uses the above optical fiber or the optical waveguide device.

The present inventors have made extensive studies in order to achieve the above objects and have found an optical functioning glass which contains $Nd^{3+}$ as an active ion and which enables optical amplification at about the 1.3-μm wavelength band or increases the amplification efficiency in this wavelength band.

In the optical functioning glass according to the present invention, an uranium ion is doped together with an active ion $Nd^{3+}$. As the host glass (matrix glass) for these dopants, an oxide-based multi-component glass such as a phosphate-based glass, a chalcogenide glass, and the like can be used in addition to a fluoride-based glass. Such an optical functioning glass can be formed by melting a material mixture in which a compound of $Nd^{3+}$ and the uranium ion is added to a glass material.

Since the uranium ion ($U^{3+}$ or $U^{4+}$) is codoped in the above optical functioning glass, emission of $Nd^{3+}$ in the 1.06-μm wavelength band can be absorbed by the uranium ion. As a result, it is found that a glass suitable for optical amplification at about the 1.3-μm wavelength band can be obtained, as will be described later.

The optical fiber according to the present invention has a core made of the optical functioning glass in which $Nd^{3+}$ is doped as an active ion in the host glass, wherein an uranium ion is codoped in the core and/or the cladding portion. This optical fiber may be formed from, e.g., a core made of the above optical functioning glass, and a cladding layer surrounding the core and having a lower refractive index than that of the core.

In the above optical fiber, since the uranium ion is codoped in the core glass doped with $Nd^{3+}$ and/or a portion of the cladding glass surrounding the core, emission of $Nd^{3+}$ at the 1.06-μm wavelength band can be absorbed by the uranium ion. For this reason, optical amplification of light of the 1.3-μm wavelength band propagating in the core glass can be performed, or the optical amplification gain can be increased. That is, light is effectively confined in the core by fiber formation, and the loss of the confined light is extremely low, thereby forming an inverted distribution in $Nd^{3+}$ with a low threshold value.

Furthermore, the optically active apparatus according to the present invention comprises the optical fiber for propagating light at the 1.3-μm wavelength band and other wavelength bands, a light source for generating light for exciting $Nd^{3+}$, and optical means for directing the excitation light from the light source to the optical fiber.

According to the above optically active apparatus, $Nd^{3+}$ is excited by, e.g., the excitation light at the 0.8-μm wavelength band directed to the optical fiber by the optical means. Most of the excited $Nd^{3+}$ ions are stimulated by light at about 1.3-μm wavelength incident together with the excitation light in the optical fiber, thereby causing induced emission at about the 1.3-μm wavelength band. Optical functions such as optical amplification, optical switching, and laser oscillation are thus realized at about 1.3-μm wavelength.

In addition, the fiber amplifier according to the present invention comprises the above optically active apparatus and coupling means for coupling the signal light at the 1.3-μm wavelength band or near the 1.3-μm wavelength band to the optical fiber. According to this fiber amplifier, large part of the excited $Nd^{3+}$ ion is stimulated by the signal light at about 1.3-μm wavelength directed together with the excitation light in the optical fiber, thereby generating radiation light. Therefore, optical amplification at about 1.3-μm wavelength can be performed.

In addition, the fiber laser according to the present invention comprises the above optically active apparatus and resonator means for feeding the light at the 1.3-μm wavelength band or near the 1.3-μm wavelength band from the optical fiber back to the optical fiber. According to this fiber laser, a portion of the excited $Nd^{3+}$ ion is stimulated by the light at about 1.3-μm wavelength emitted from the optical fiber and is stimulated by the light at about 1.3-μm wavelength fed back to the optical fiber, thereby generating emission at about 1.3-μm wavelength. Laser oscillation at the 1.3-μm wavelength band can be performed by repeating this emission.

In the above optically active apparatus, the optical fiber can be replaced by a similar optical waveguide device. In this case, the optical waveguide device comprises a core made of an optical functioning glass obtained by doping $Nd^{3+}$ in the host glass as the active ions, wherein an uranium ion is doped in the core and a portion of claddinglayer surrounding the core. Optical functions such as optical amplification, optical switching, and laser oscillation at the 1.3-μm wavelength band and other wavelength band can be realized by the optically active apparatus using this optical waveguide device.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DESCRIPTION OF THE PREFERRED EMBODIMENT

The principle of the present invention and the process in which the present invention is established will be described below. The present inventor proposed the following assumption to explain the above described phenomenon and made extensive studies on it.

That is, the excitation light at the 0.8-μm wavelength band which impinges on the $Nd^{3+}$-doped optical functioning glass excites $Nd^{3+}$ as the active ion. As a result, radiation at the 1.3-μm wavelength band corresponding to energy transition from an energy level $^4F_{3/2}$ to an energy level $^4F_{13/2}$ and other radiations, e.g., radiation at the 1.06-μm wavelength band corresponding to an energy transition from the energy level $^4F_{3/2}$ to an energy level $^4F_{11/2}$ are enabled.

This phenomenon associated with the Nd ions will be considered statistically. Most of ions $Nd^{3+}$ in the host glass are excited to be capable of performing transitions corresponding to emission at the wavelength bands such as the 1.06- and the 1.3-μm wavelength bands. Some of the excited ions $Nd^{3+}$ emit light of the 1.3-μm wavelength band with a predetermined probability by spontaneous or induced emission. Some of the excited ions $Nd^{3+}$ emit light of the 1.06-μm wavelength band, but not of the 1.3-μm wavelength band, with a predetermined probability by spontaneous or induced emission. In this case, if a certain amount of absorbent for absorbing only light of the 1.06-μm wavelength band is present in the host glass, the absorbent absorbs radiated light of the 1.06-μm wavelength band and can suppress induced emission caused by light of the 1.06-μm wavelength band. As a result, emission of light at the 1.06-μm wavelength band can be suppressed, and a decrease in induced emission efficiency in the 1.3-μm wavelength band can be prevented.

The above assumption will be described in more detail with reference to FIGS. 1, 2, and 3.

Figure 1:
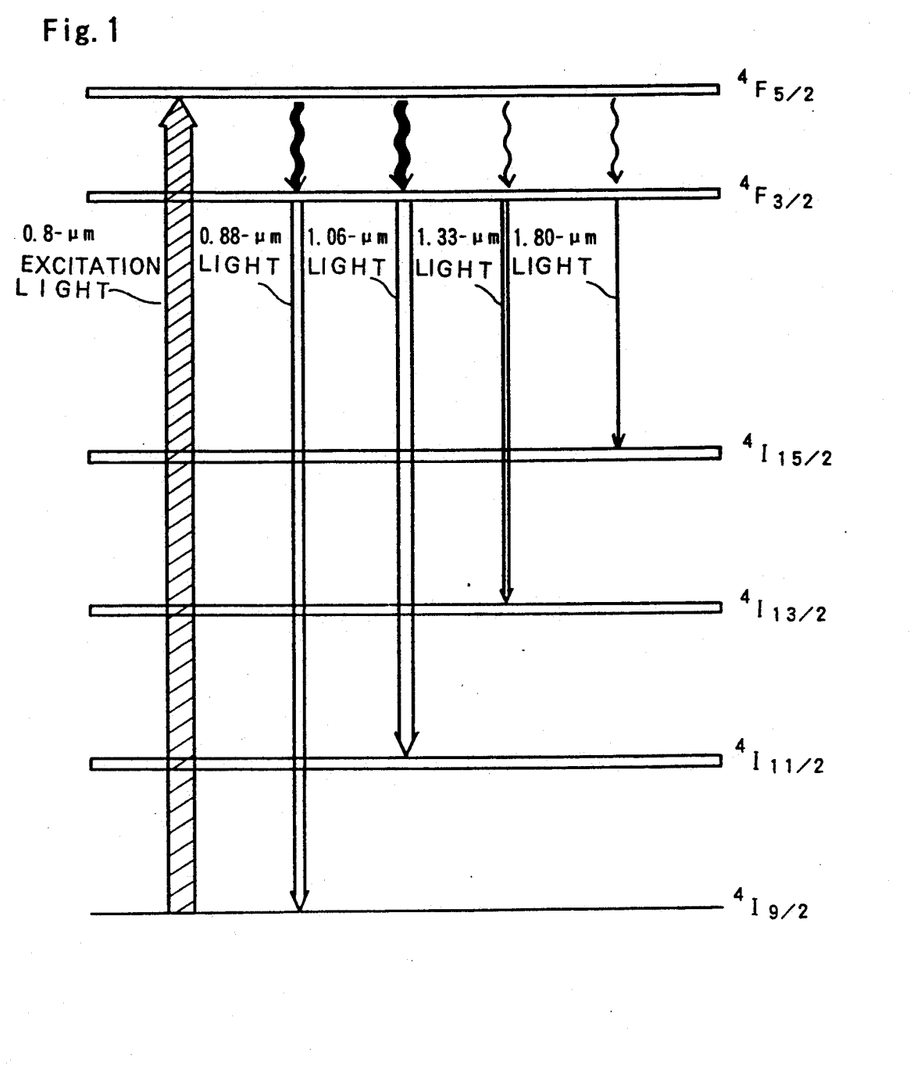
FIG. 1 shows the energy levels of Nd.

FIG. 1 shows the energy level of $Nd^{3+}$ as an active ion doped in a phosphate-based glass sample. The wavelengths of light absorption/emission shown in FIG. 1 are calculated by measuring a fiber formed from this glass by using a self-recording spectrometer and a spectrum analyzer. Major transitions will be described. An electron set in a ground level $^4I_{9/2}$ is temporarily excited to a level $^4F_{5/2}$ by excitation light of about 0.80-μm, and then emits phonon to shift to a level $^4F_{3/2}$. By this pumping and non-radiation transition, when an inverted distribution is formed between each of the levels $^4I_{9/2}$, $^4I_{11/2}$, $^4I_{13/2}$, and $^4I_{15/2}$, and the level $^4F_{3/2}$, emission having peaks at the 0.88-, 1.06-, 1.33-, and 1.80-μm wavelengths band can be performed. Of these wavelengths, the ratio in intensity of light emission of each of the 0.88-, 1.06-, and 1.33-μm wavelengths band corresponds to a ratio in height of the fluorescence peak obtained when only excitation light is incident on the same fiber, and the ratio in measured values of the respective heights was about 5:9:1. Note that the intensity of light emission of the 1.80-μm wavelength band is lower than these intensities.

Figure 2A:
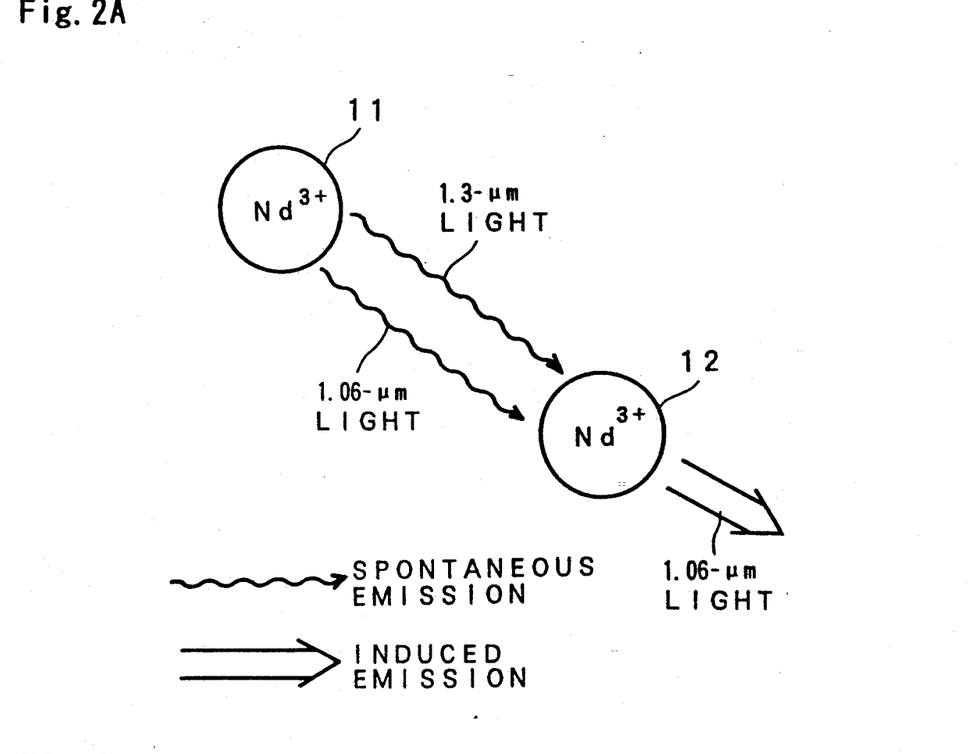
FIG. 2A shows a case in which an absorbent ion is not codoped in an optical functioning glass.
Figure 2B:
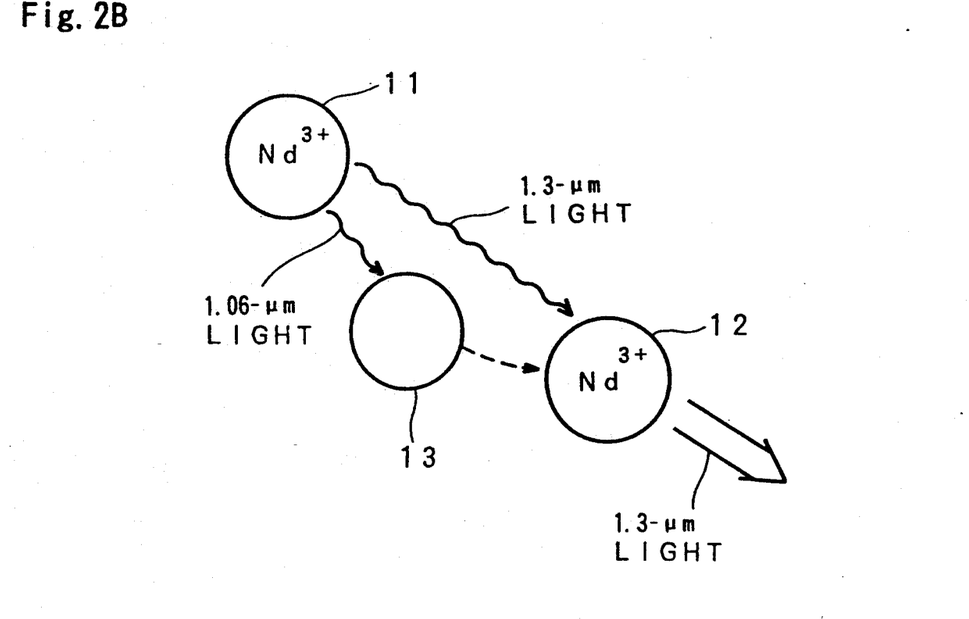
FIG. 2B shows a case in which an absorbent ion is codoped in an optical functioning glass.

FIGS. 2A and 2B show methods of decreasing induced emission caused by light emission at the 1.06-μm wavelength band, in order to cope with the fact that the light emission probability at this band is very high.

Referring to FIG. 2A, first excited Nd ions 11 emit light of, e.g., the 1.3- or 1.06-μm wavelength band by spontaneous emission. In this case, since the light emission probability at the 1.06-μm wavelength band is very high, most of second Nd ions 12 emit light of the 1.06-μm wavelength band. Referring to FIG. 2B, first excited Nd ions 11 emit light of the 1.3- or 1.06-μm wavelength band, as in FIG. 2A. If an appropriate absorbent (or absorbing element) 13 capable of absorbing only light of the 1.06-μm wavelength light is present, the emission light at the 1.06-μm wavelength band is absorbed by the absorbent 13 and does not influence the second Nd ions 12. As a result, induced emission caused by light of the 1.06-μm wavelength band can be suppressed, and the probability of induced emission at the 1.3-μm wavelength band can be increased.

The conditions of the absorbent are that it can absorb spontaneous or induced emission light of about 1.06-μm wavelength immediately, that it does not absorb emission light of about 1.3-μm wavelength, and so on. When an active ion is used as such an absorbent and doped in the host glass together with $Nd^{3+}$, use of a transition metal and the like having a broad absorb-band is not appropriate, and use of a rare-earth element having a sharp absorbing-band is preferable. Also, a multiple of electrons must be present at an energy level as an excitation target, and the state density of the energy level after transition must be high. An Uranium ion can be selected as a codoped active ion satisfying these conditions.

Figure 3:
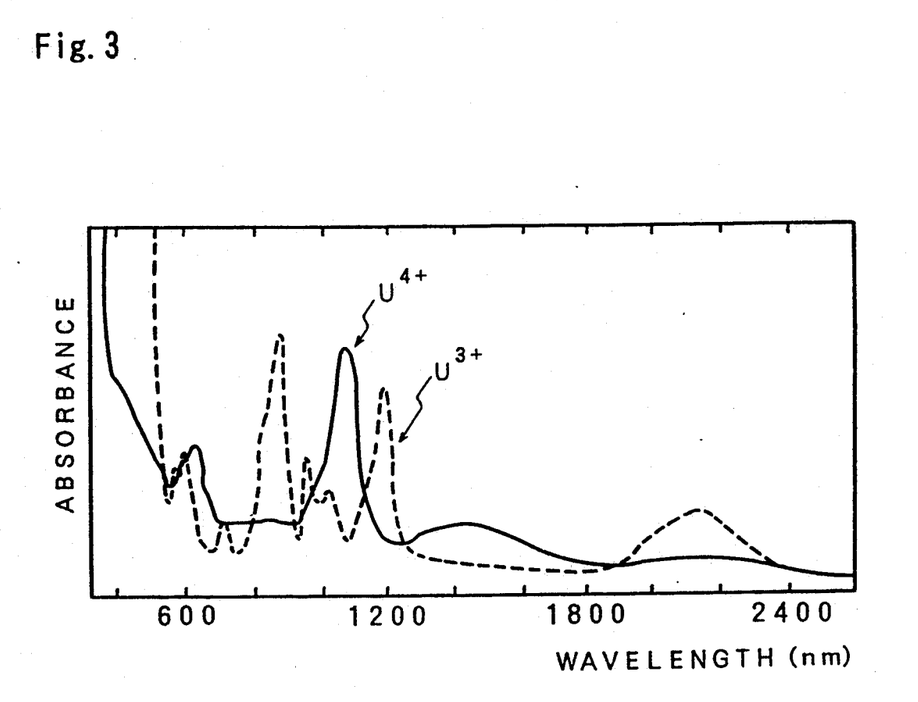
FIG. 3 is a graph showing the absorbance of uranium.

As shown in FIG. 3, $U^{3+}$ and $U^{4+}$ in the glass respectively have absorption peaks between 1.1- and 1.2-μm wavelengths (refer to "J. Phys. Condens. Matter I (1989) 8753-8758"). In addition, as is apparent from FIG. 3, absorption by $U^{3+}$ and $U^{4+}$ near 1.3-μm wavelength is relatively weak and is thus negligible. Therefore, $U^{3+}$ and $U^{4+}$ are expected to sufficiently satisfy the conditions of the absorbent for spontaneous emission light of about 1.06-μm wavelength. Considering the fact that the absorption peak of $U^{4+}$ is closer to the 1.06-μm wavelength than that of $U^{3+}$, to use $U^{4+}$ as the absorbent is more preferable. It is assumed that no inverted population can be formed in $U^{4+}$ itself by an absorption of spontaneous emission light.

It is still unclear whether the above assumption is appropriate. In any case, according to the experiments and examinations of the present inventors, when an uranium ion such as $U^{3+}$ and $U^{4+}$ is codoped in the glass in which $Nd^{3+}$ has been doped as active ion, light emission of $Nd^{3+}$ in the 1.06-μm wavelength band can be absorbed by the uranium ion, and a promising optical functioning glass which allows optical amplification of $Nd^{3+}$ at the 1.3-μm wavelength band or improves its optical amplification efficiency can be obtained.

This optical functioning glass is used as an optical transmission line material. For example, this glass material is used to form a planar waveguide or the like. It is preferable to manufacture an optical fiber having a core made of the above optical functioning glass and a cladding surrounding the core and having a lower refractive index than that of the core, so as to obtain an elongated optical transmission line.

Figure 4:
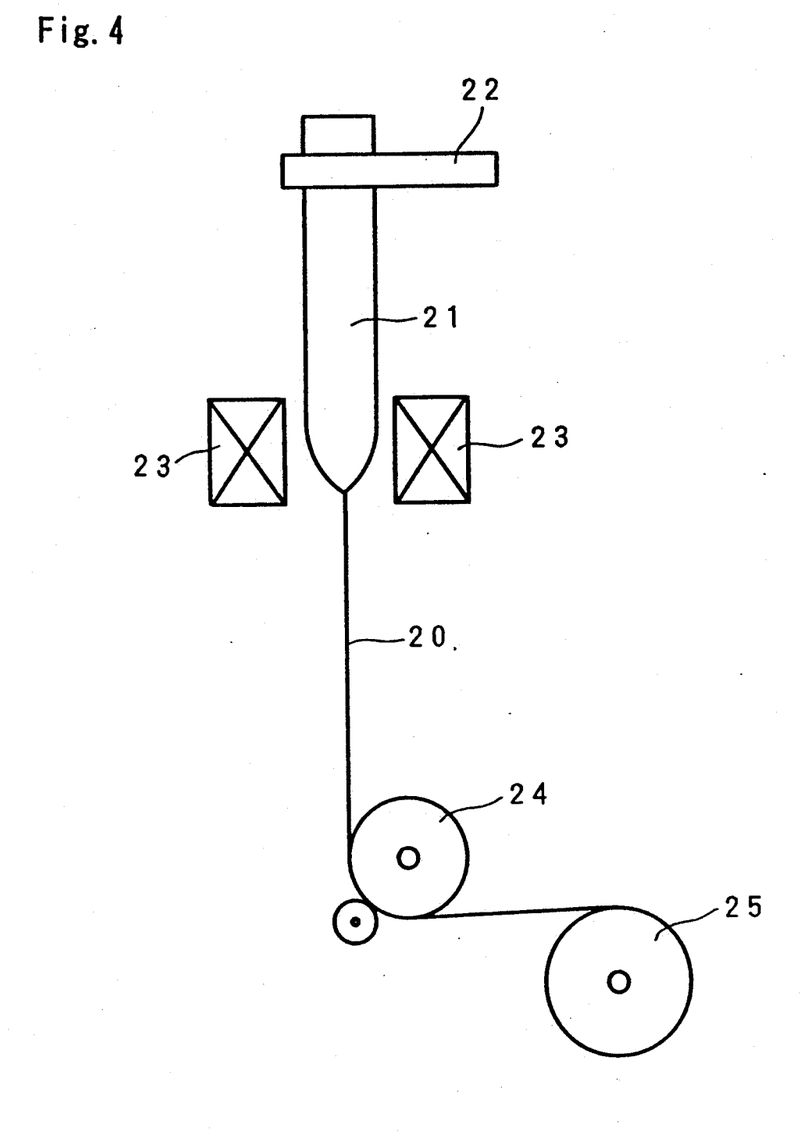
FIG. 4 shows an apparatus for forming a fiber using the optical functioning glass doped with the absorbent ion of FIG. 2B.
Figure 5:
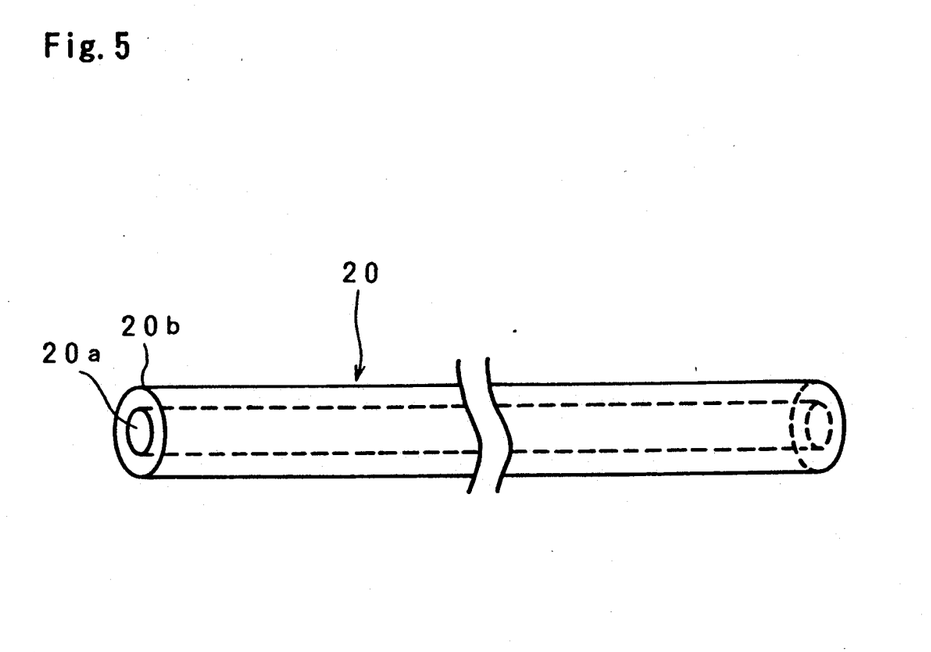
FIG. 5 shows a fiber sample formed by the apparatus of FIG. 4.

The above optical fiber is manufactured as follows in practice. An optical functioning glass doped with $Nd^{3+}$ and codoped with the uranium ion is prepared, and a preform having a core made of this optical functioning glass is formed in accordance with a rod-in-tube method. The prepared preform is set in a drawing apparatus as shown in FIG. 4 and is drawn into an optical fiber. As shown in FIG. 4, a preform 21 is fixed by a feed unit 22 and is gradually dropped. At this time, the preform 21 is heated by a heater 23 to be softened, and drawing is started. A fiber 20 obtained by drawing is taken up by a take-up drum 25 through a capstan 24. FIG. 5 is an enlarged view of the optical fiber 20 obtained in this manner. The optical fiber 20 comprises a core 20a doped with $Nd^{3+}$ and codoped with the uranium ion and a cladding layer 20b having a relatively lower refractive index than that of the core 20a and not doped with $Nd^{3+}$ or the uranium ion.

The optical fiber having the core made of the optical functioning glass described above can be applied to an optically active apparatus such as a fiber laser, a fiber amplifier, and a fiber detector. More specifically, since the uranium ion is codoped in the core glass together with $Nd^{3+}$, the probability of induced emission is increased to obtain a sufficiently high optical amplification gain even at the 1.31-μm wavelength band. Also, loss due to emission of light of the 1.06-μm wavelength band is decreased. In addition, since light is efficiently confined in the core by fiber formation and its optical loss is extremely low, an inverted population can be formed with a small threshold value. Therefore, applications for a high-gain optical amplifying apparatus, optical switch, and optical laser can be made possible.

Figure 6:
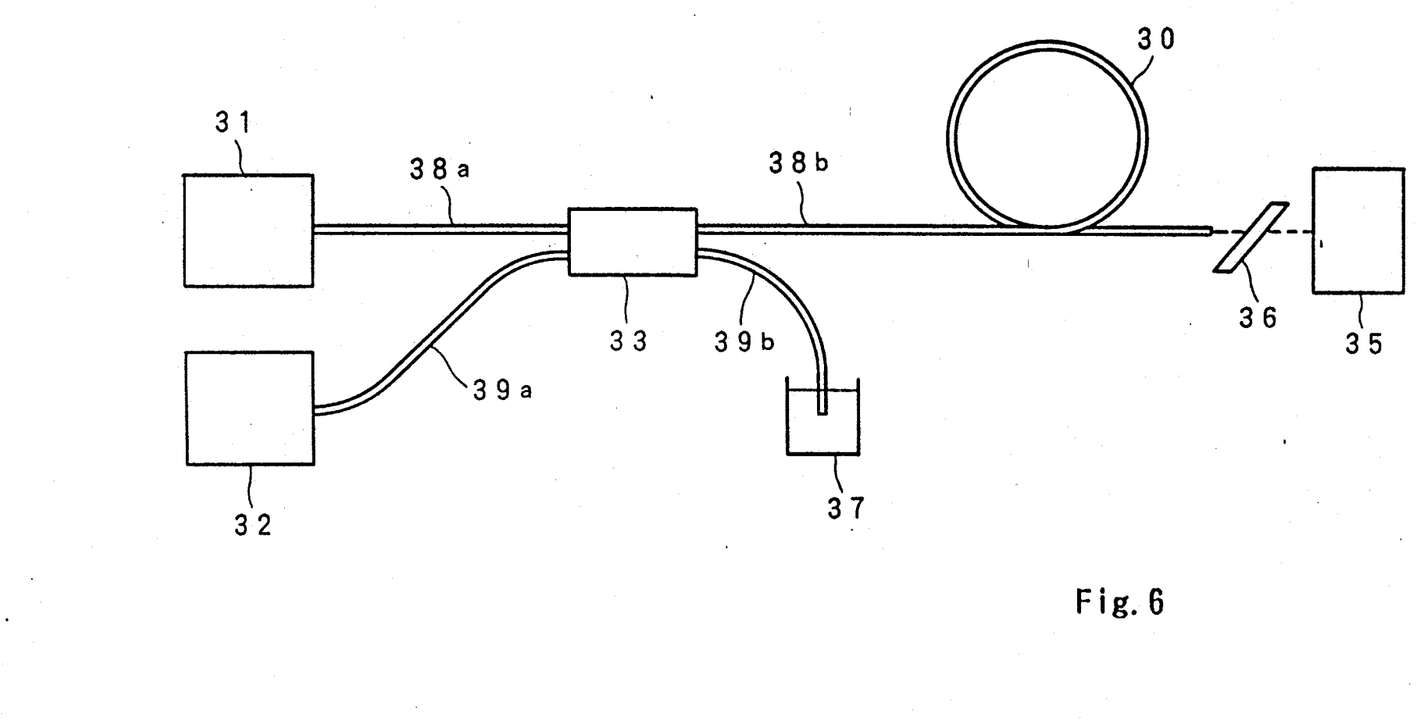
FIG. 6 shows an arrangement of a fiber amplifier according to an embodiment of the present invention.

In addition, according to another application, the above optical fiber 20 can be used in a fiber amplifier for amplifying light of the 1.3-μm wavelength band. For example, as shown in FIG. 6, the fiber amplifier comprises an optical fiber 30, a laser source 32, a coupler device 33, 38a, 38b, 39a, 39b. The optical fiber 30 serves as an optical transmission line for laser light of the 1.3-μm wavelength band. The laser source 32 generates excitation light of the 0.8-μm wavelength band. The coupler device 33, 38a, 38b, 39a, 39b directs the excitation light from the laser source 32 to the optical fiber 30. More specifically, the excitation light from the laser source 32 is incident on a directional coupler 33 via the optical fiber 39a and is guided to the optical fiber 30 via the optical fiber 38b and an isolator (not shown). Signal light from the signal light source 31 is also guided to the directional coupler 33 via the optical fiber 38a. The signal light is combined with the excitation light and is coupled to the optical fiber 30.

The directional coupler 33 is, e.g., a fused biconical taper coupler which is formed by fusing and extending two optical fibers 38 and 39. In this case, the terminal end of the optical fiber 39b extending from the directional coupler 33 is dipped in a matching oil 37 for preventing return light from the optical fiber 39b to the directional coupler 33.

A spectrum analyzer 35 is arranged at the output of the optical fiber 30. A filter 36 is inserted between the optical fiber 30 and the spectrum analyzer 35. The filter 36 cuts off excitation light of light output from the optical fiber 30. As a result, the spectrum analyzer 35 can measure only the signal light output from the optical fiber 30, and the gain of light amplification can be determined.

With the fiber amplifier of the 1.3-μm wavelength band which includes the optical fiber containg $Nd^{3+}$, the laser source, and the coupler, $Nd^{3+}$ is excited by the laser light of the 0.6-μm wavelength band guided to the fiber by the optical means. Large part of excited Nd ion is stimulated by the signal light of the 1.3-μm wavelength band, which is guided to the optical fiber together with the laser light, and generate mainly radiation light corresponding to a transition from the level $^4F_{3/2}$ to the level $^4I_{13/2}$, thus enabling amplification of light of the 1.3-μm wavelength band. In this case, since generation of light of the 1.06-μm wavelength band corresponding to the transition from the level $^4F_{3/2}$ to the level $^4I_{11/2}$ is suppressed by the presence of $U^{4+}$ or $U^{3+}$, a decrease in optical amplification efficiency at the 1.3-μm wavelength band can be prevented.

Figure 7:
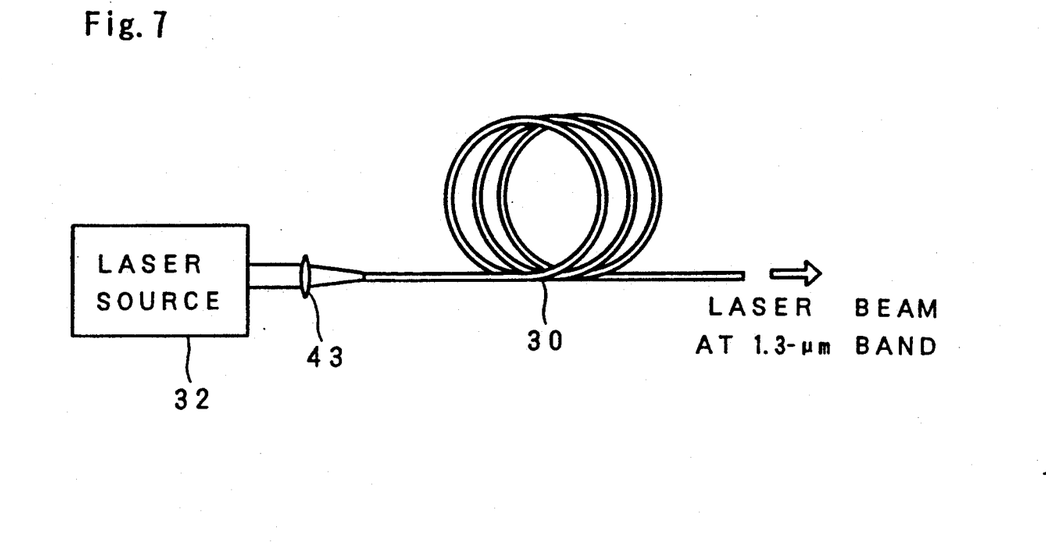
FIG. 7 shows an arrangement of a fiber laser according to another embodiment of the present invention.

According to another application, the optical fiber 20 as shown in FIG. 5 can be used as a fiber laser of the 1.3-μm wavelength band. FIG. 7 shows an embodiment of a 1.3-μm wavelength band fiber laser. A laser source 32 is identical to that used in the fiber amplifier shown in FIG. 6. That is, the laser source 32 is a Ti-sapphire laser launching light at 0.8-μm wavelength. An optical fiber 30 doped with $Nd^{3+}$ and codoped with $U^{4+}$ or $U^{3+}$ is also identical to that used in the above fiber amplifier.

Excitation light having a wavelength of 0.8 μm from the laser source 32 is incident on one end of the optical fiber 30 doped with the active ion $Nd^{3+}$ via an appropriate means 43 such as a lens or an optical connector. $Nd^{3+}$ contained in the optical fiber is excited to a predetermined state by this excitation light, and light at the 1.3-μm wavelength band can be emitted. Since the input and output ends of the optical fiber 30 are polished mirror surfaces, these end faces of the input and output ends constitute a resonator. As a result, when output excitation light exceeds a predetermined value, laser oscillation occurs at any wavelength within the 1.3-μm wavelength band. In this case, the induced emission efficiency, i.e., the laser oscillation efficiency of $Nd^{3+}$ can be increased because of the presence of $U^{4+}$ or $U^{3+}$ codoped together with $Nd^{3+}$. When a semiconductor laser is used as the laser source 32, the optical resonator can be constituted by an output end of the optical fiber and an end face of the semiconductor laser. The optical resonator can also be constituted by using a dielectric mirror.

Figure 8:
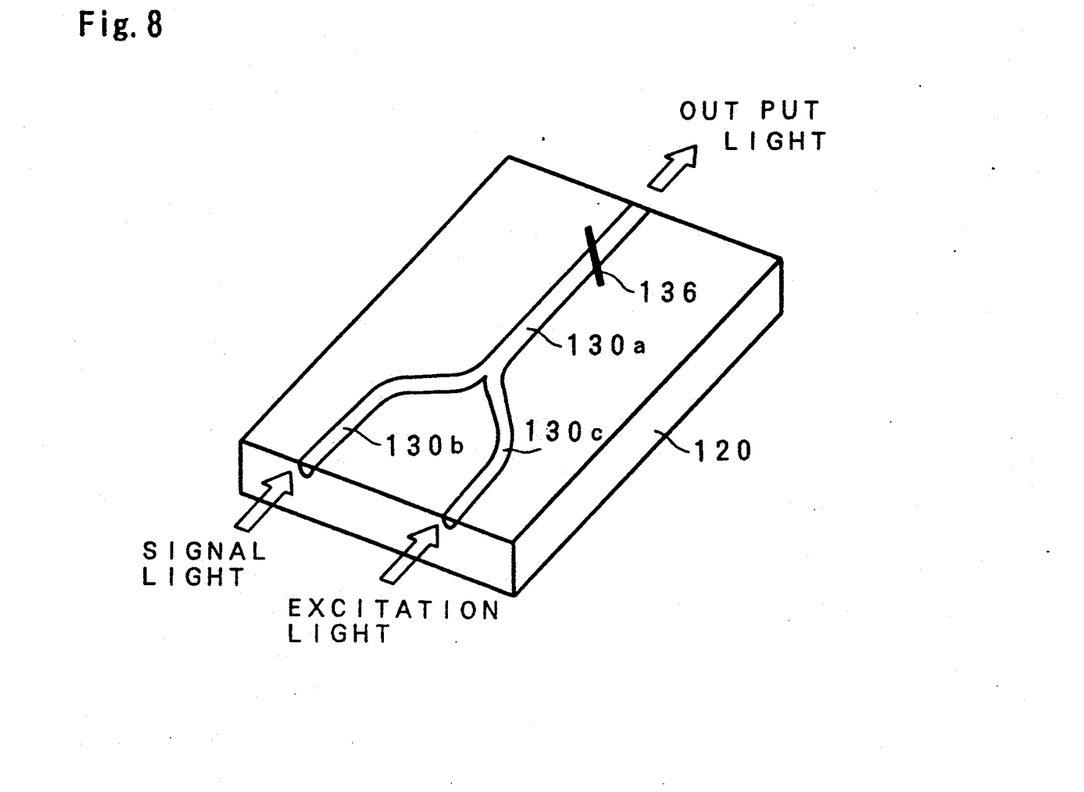
FIG. 8 shows an arrangement of a waveguide amplifier according to still another embodiment of the present invention.

FIG. 8 shows an embodiment of a waveguide amplifier of the 1.3-μm wavelength band. Planar waveguides 130a, 130b, and 130c are formed on a substrate 120 so that one waveguide is branched into two waveguides. The planar waveguide 130a is doped with $Nd^{3+}$ as an active ion and codoped with $U^{4+}$ or $U^{3+}$ as an absorbent ion. A filter 136 made of a grating is formed at the other end of the planar waveguide 130a. Signal light having the 1.31-μm wavelength band is incident on the planar waveguide 130b. Excitation light having the 0.80-μm wavelength band is incident on the planar waveguide 130c. A laser source laundering the excitation light is identical to that shown in FIG. 6.

An operation of the waveguide amplifier shown in FIG. 8 will be briefly described. The signal light at 1.31-μm wavelength band is incident on the planar waveguide 130a through the planar waveguide 130b. The excitation light at the 0.80-μm wavelength band from the excitation light source such as a semiconductor laser is also incident on the planar waveguide 130a through the planar waveguide 130c. The excitation light excites the $Nd^{3+}$ serving as an active ion for optical amplification. The excited $Nd^{3+}$ is stimulated by the signal light, and radiation light at the 1.31-μm wavelength band is efficiently generated. When the excitation light exceeds a predetermined intensity, the signal light is amplified.

The above description exemplifies the optical fiber as shown in FIG. 5 which has a core doped with $Nd^{3+}$ and codoped with $U^{4+}$ or $U^{3+}$. Considering the function of the codoped $U^{4+}$ and $U^{3+}$, it is apparent that such $U^{4+}$ and $U^{3+}$ can be codoped not only in the core but also in the cladding layer surrounding the core. In this case, the region to be codoped with $U^{4+}$ or $U^{3+}$ is appropriately determined in accordance with various design parameters, e.g., a difference in relative refractive index between the core and the cladding layer, the core diameter, and so on.

A practical embodiment of the present invention made by the present inventors will be described. $ZrF_4$, $BaF_2$, $LaF_3$, $AlF_3$, and $NaF$ were prepared as host glass materials and blended to provide a glass of a composition $53ZrF_4$-$20BaF_2$-$3.5LaF_3$-$20NaF$ (mol %), fluoride materials of neodymium and uranium $NdF_3$ and $UF_4$, were added to the host glass material in predetermined amounts, and the resultant mixture was melted in a platinum crucible in a reducing atmosphere. The amount of the additive $NdF_3$ was adjusted such that the weight concentration of $Nd^{3+}$ became 500 ppm with respect to the host glass. The amount of the additive $UF_4$ was adjusted such that the weight concentrations of $U^{4+}$ with respect to the host glass became 0, 200, 500, 700, and 1,000 ppm. That is, the $U^{4+}$ concentrations with respect to $Nd^{3+}$ are 0, 40, 100, 140, and 200%. The molten material was sufficiently stirred and then quickly cooled to vitrify it.

A fiber was fabricated in the following manner in order to evaluate the optical amplification characteristics of this glass. A glass having the above composition was formed into a rod-like shape, thus forming a core rod. Subsequently, a glass having substantially the same composition as that of the core rod and a refractive index slightly lower than that of the core rod was melted and formed into a cladding pipe. The cladding pipe was not doped with $Nd^{3+}$ or $U^{4+}$. These core rod and cladding pipe were formed into a preform and drawn by the apparatus shown in FIG. 4. As a result, an SM (single mode) fiber having a core diameter of 8-μm and an outer diameter of 125-μm was obtained. The SM fiber was cut into a fiber sample of a length of 10 m for measurement.

Figure 9:
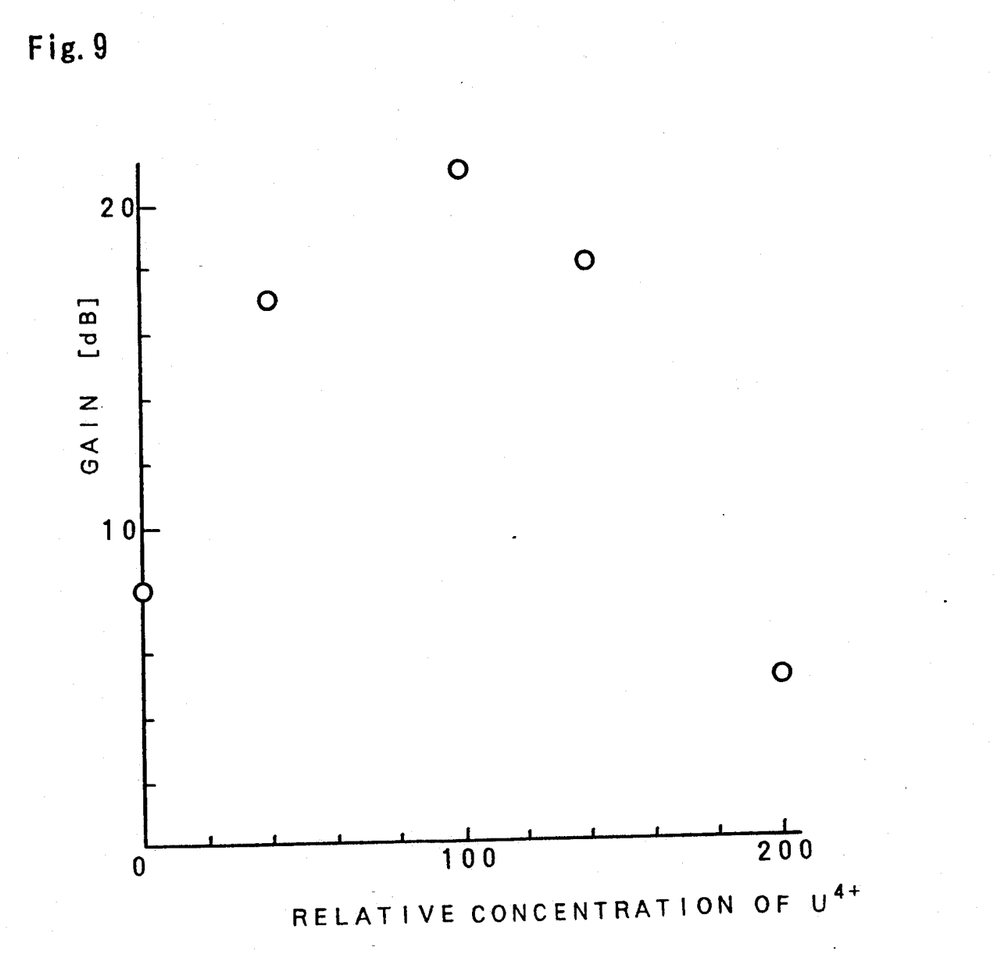
FIG. 9 is a graph showing a relationship between a gain of the fiber amplifier of FIG. 6 at the 1.330-μm wavelength and a concentration of $U^{4+}$.

Evaluation of the characteristics of such a fiber sample was performed by the fiber amplifier shown in FIG. 6 and the like. FIG. 9 is a graph showing the result.

The gain shown in FIG. 9 is for a wavelength of 1.330-μm. A Ti-sapphire laser was used as the laser source 32. The excitation wavelength was set to 0.78-μm and the intensity of excitation light was set to 10 mW. The intensity of input signal was set to −30 dBm, and the peak wavelength was set to 1.330-μm.

As shown in FIG. 9, it is apparent that, when the concentration of $U^{4+}$ codoped in the core glass falls within a range of about 50 to 150% with respect to $Nd^{3+}$, a gain exceeding a predetermined value can be obtained. When the $U^{4+}$ concentration is less than 50%, the obtained gain is low. This may be because the concentration of $U^{4+}$ serving as the absorbing ion is low and the probability of $U^{4+}$ present near $Nd^{3+}$ is low. This may also be because $U^{4+}$ capable of absorbing light of the 1.06-μm wavelength band radiated by $Nd^{3+}$ is not present sufficiently. The obtained gain is low when the $U^{4+}$ concentration is more than 150%. This may be because the concentration of $U^{4+}$ serving as the absorbing ion becomes excessively high, the excitation light is thus absorbed by an edge of the absorption of $U^{4+}$ having the absorbing center at 0.86-μm wavelength, and signal light of the 1.33-μm wavelength is absorbed by an edge of absorption of $U^{4+}$ having the absorbing center at 1.2-μm wavelength.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An optical functioning glass comprising a host glass doped with $Nd^{3+}$ as an active lasing ion and doped with a quantity of $U^{4+}$ which absorbs an emission at about 1.06 μm wavelength band to suppress induced emission of $Nd^{3+}$ at about 1.06 μm wavelength band and to increase a probability of the induced emission of $Nd^{3+}$ at about 1.3 μm wavelength band.

2. A glass according to claim 1, wherein the host glass is a fluoride-based glass.

3. A glass according to claim 1, wherein $U^{4+}$ has a concentration of 50 to 150% relative to that of $Nd^{3+}$.

4. A method of manufacturing the optical functioning glass of claim 1, comprising the steps of: melting a material mixture containing a compound of $Nd^{3+}$ and $U^{4+}$ added to a multi-component glass material; and cooling the melted material mixture to form the optical functioning glass.

5. A method according to claim 4, wherein the multi-component glass material is a material mixed with a fluoride-based compound.

6. A method according to claim 4, wherein the material mixture is prepared by adding compounds of $Nd^{3+}$ and $U^{4+}$ in the multi-component glass material so that a concentration of $U^{4+}$ with respect to $Nd^{3+}$ becomes 50 to 150%.

* * * * *